(12) United States Patent
Laursen et al.

(10) Patent No.: US 9,714,858 B2
(45) Date of Patent: Jul. 25, 2017

(54) CONSUMPTION METER HOUSING WITH FEED THROUGH FOR EXTERNAL COMMUNICATION EQUIPMENT

(71) Applicant: Kamstrup A/S, Skanderborg (DK)

(72) Inventors: Peter Schmidt Laursen, Skanderborg (DK); Søren Tønnes Nielsen, Solbjerg (DK); Jens Lykke Sørensen, Beder (DK)

(73) Assignee: KAMSTRUP A/S, Skanderborg (DK)

( * ) Notice: Subject to any disclaimer, the term of this patent is extended or adjusted under 35 U.S.C. 154(b) by 61 days.

(21) Appl. No.: 14/443,772

(22) PCT Filed: Nov. 21, 2013

(86) PCT No.: PCT/DK2013/050394
§ 371 (c)(1),
(2) Date: May 19, 2015

(87) PCT Pub. No.: WO2014/079460
PCT Pub. Date: May 30, 2014

(65) Prior Publication Data
US 2015/0276454 A1    Oct. 1, 2015

(30) Foreign Application Priority Data
Nov. 21, 2012 (EP) .................................... 12193649

(51) Int. Cl.
*G01F 15/06* (2006.01)
*G01D 4/02* (2006.01)
*G01D 11/24* (2006.01)

(52) U.S. Cl.
CPC ............... *G01F 15/06* (2013.01); *G01D 4/02* (2013.01); *G01D 11/24* (2013.01)

(58) Field of Classification Search
CPC .................................. G01F 15/06; G01F 15/14
See application file for complete search history.

(56) References Cited

U.S. PATENT DOCUMENTS 5,014,213 A   5/1991 Edwards
5,734,103 A   3/1998 Walding, Jr. et al.
(Continued)

FOREIGN PATENT DOCUMENTS

CA   2 756 703 A1   1/2012
EP   1 502 540 A1   2/2005
(Continued)

OTHER PUBLICATIONS

International Search Report for PCT/DK2013/050394 dated Feb. 20, 2014.

*Primary Examiner* — Erika J Villaluna
(74) *Attorney, Agent, or Firm* — Renner, Otto, Boisselle & Sklar, LLP

(57) ABSTRACT

A consumption meter is provided with a conductive feed through for external communication equipment. The meter comprises a housing (104) which forms a closed compartment when an opening of the housing is closed with a cover (106). The compartment includes a communication module (204) and the conductive feed through comprises at least one conductive path (202, 408) from the communication module (204) to an outside part of the meter (102), which outside part is subject to ambient conditions. The path is provided via the opening of the housing and a sealing means (210) in the opening of the housing is used to seal against a first surface (308) of the conductive path when the cover is attached to the housing.

20 Claims, 8 Drawing Sheets

(56) References Cited

U.S. PATENT DOCUMENTS

| | | |
|---|---|---|
| 6,243,040 B1 | 6/2001 | Corey et al. |
| 8,159,401 B2 | 4/2012 | Hao et al. |
| 2001/0017538 A1 | 8/2001 | Loibl et al. |
| 2005/0230040 A1* | 10/2005 | Walding, Jr. ............. F16J 15/14 156/273.3 |
| 2009/0224937 A1 | 9/2009 | Gillette et al. |
| 2010/0253538 A1 | 10/2010 | Smith |

FOREIGN PATENT DOCUMENTS

| | | |
|---|---|---|
| EP | 1 653 554 A1 | 5/2006 |
| EP | 2 442 402 A1 | 4/2012 |
| EP | 2 503 304 A1 | 9/2012 |
| JP | S 57-192827 A | 11/1982 |
| JP | 7-99403 A | 4/1995 |
| JP | 2007242916 A * | 9/2007 |
| NL | 1007154 C1 | 3/1990 |
| WO | WO 2005/091433 A1 | 9/2005 |
| WO | WO 2005/094154 A2 | 10/2005 |
| WO | WO 2010/118171 A1 | 10/2010 |
| WO | WO 2012/119619 A1 | 9/2012 |

\* cited by examiner

CONSUMPTION METER HOUSING WITH FEED THROUGH FOR EXTERNAL COMMUNICATION EQUIPMENT

CROSS REFERENCE TO RELATED APPLICATIONS

This application is a U.S. National Phase Application of PCT International Application Number PCT/DK2013/050394, filed on Nov. 21, 2013, designating the United States of America and published in the English language, which is an International Application of and claims the benefit of priority to European Patent Application No. 12193649.6, filed on Nov. 21, 2012. The disclosures of the above-referenced applications are hereby expressly incorporated by reference in their entireties.

FIELD OF THE INVENTION

The invention relates to a consumption meter adapted for attachment of external communication equipment.

BACKGROUND OF THE INVENTION

Consumption meters for calculating a consumed quantity of water, heat, cooling, gas or the like, typically have a flow part with a through-going opening that forms a flow passage for a flow of the quantity to be measured and a compartment or housing with a cavity for housing electronic components of the meter. The housing serves to protect the electronic components, such as a measuring circuit for operating the meter, ultrasonic transducers for determining the flow in the flow passage, and additional electronic equipment, such as a calculation circuit for calculating the consumed quantity, a display for displaying a value representing the consumed quantity, a battery for powering the electronic components, a communication module, etc. In particular, the housing serves to protect the electronic components from exposure to the ambient conditions when the consumption meter is placed in wet or moist surroundings.

In a system with automatic meter reading for reporting the consumed quantity, a communication module is used for wireless transmission of the value or a signal representing the consumed quantity. It is of benefit that the signal can be transmitted a certain communication distance i.e. that the consumption meter has a certain communication range. This communication range should preferably be present during the lifetime of the consumption meter.

The desire of protecting the electronic components from ambient exposure and the desire of a certain communication range may be in conflict with each other. One solution of protecting the electronic components is to use an internal antenna, which however may hamper the communication range. Another solution of ensuring a certain communication range is to use an external antenna, this may however either hamper the protection of the electronic components due to the presence of an electric feed through or require a costly solution to provide a housing which protects, and continues to protect, the electronics against exposure from ambient conditions.

In U.S. Pat. No. 5,734,103 a consumption meter instrument is disclosed where a sealing material is used to join together a top and a base of the instrument. A sealed wire entry port is provided where a pair of insulated wires runs through the body of the sealing material. The instrument further comprises a vent which is adapted to be closed after a gas has been either evacuated or introduced into the interior of the housing to reduce moisture within the housing before final sealing.

SUMMARY OF THE INVENTION

It would be advantageous to achieve a solution where a consumption meter is able to function for a long period under various ambient conditions. More specifically, it would be advantageous to achieve a consumption meter with improved communication capabilities which is resistant to operating under various ambient conditions. In particular, it would be advantageous to provide a consumption meter which is adapted for attachment of external communication equipment in a cost-efficient manner, which does not jeopardize the ability of the meter to operate under various ambient conditions.

In general, the invention preferably seeks to mitigate, alleviate or eliminate one or more of the above mentioned disadvantages singly or in any combination. In particular, it may be seen as an object of the present invention to provide a solution that solves the above mentioned problems, or other problems, of the prior art.

The present invention provides a consumption meter for measuring consumption data of a supplied utility and with a conductive feed through for external communication equipment, the consumption meter comprising:

a housing with an opening, where the housing forms a closed compartment when the opening of the housing is closed with a cover, a sealing means provided in the opening of the housing to provide a sealed closed compartment when the opening of the housing is closed with the cover, and a communication module provided in the closed compartment, where the conductive feed through comprises at least one conductive path from the communication module via the opening and to an outside part of the consumption meter, which outside part is subject to ambient conditions outside the closed compartment, characterized in that the at least one conductive path comprises a first and a second section, where the first section provides a conductive feed from the communication module, and where the second section is comprised on an inner surface of the housing or an inner surface of the cover, and where the first and second sections form a conductive connection between the first and the second sections when the consumption meter is assembled, and where the sealing means in the opening of the housing seal against a first surface of the conductive path when the housing is closed with the cover.

Thus a consumption meter is provided which due to the provision of the conductive path is able to function for a long period under various ambient conditions even in a situation where external communication equipment is connected. It is advantageous that external equipment may be connected to internal equipment in a manner which does not further expose equipment inside the closed compartment to moist or other harmful substances from the ambient conditions in which the meter is placed.

Advantageously, a single sealing means which is provided in a single opening of the housing is also used as a sealing for the conductive path. In this manner, the housing is closed off and the compartment is protected from the ambient with only a few elements.

An advantage may be that deployment of external communication equipment can easily be provided, while still providing a controlled protection of the components inside the housing from the ambient conditions. External communication equipment may increase the transmission range and/or lower the use of power need for data transmission.

Still further, a possible advantage is that the described solution enables an easy addition of external communication equipment, e.g., for one or more consumption meters among a plurality of consumption meters, which are not able to transmit their values far enough under the given radio transmission conditions. Thus the described solution enables retrofitting the consumption meter with external communication equipment.

In a general embodiment, the at least one conductive path comprises a terminal for connection of the external communication equipment on the outside part of the consumption meter. A surface of the conductive part on the outside of the consumption meter may be seen to be enough to serve as a terminal.

Advantageously, the first and a second sections of the at least one conductive path are pressed and held towards each other to form a conductive connection between the first and the second sections when the consumption meter is assembled. In an embodiment, an end part of the first section is flexible and biased towards the second section when the meter is assembled. In general however, other means may be used for electrically connecting the two sections, such as by use of solder or a plug connection.

In embodiments, the at least one conductive path is provided, at least in part, by use of a chemical or physical deposition technique, e.g. Chemical or Physical Vapor Deposition, CVD or PVD, on the housing or on the cover. In embodiments of the invention such path provided by such deposition is provided on both an inner and outer surface of the housing or of the cover. Such deposition, or any other conductive layer or member particularly suitable for use as described herein, may end after or just after passing the sealing means. In such a way it is possible to connect to the at least one conductive path at a position in the ambient conditions and hereby, e.g., provide a terminal in the ambient conditions. The terminal is possibly for a cable or an external antenna or may in itself be used as at least a part of an external antenna.

Such type of path can be provided in a way where ambient conditions are not able to enter the compartment in the housing. This may be due to the limited thickness such path can be provided with and/or due to such path preventing ambient conditions from entering the compartment in the housing between a second surface of the path and the housing or between a second surface of the path and the cover.

Further, a CVD or PVD path, and possibly the limited thickness thereof, enables the sealing means between the housing and the cover, to prevent the ambient conditions from entering the cavity along other surfaces, such as the first surface, of the path. Preferably, the sealing means is the one already included between the cover and the housing for closing the single opening of the housing. Preferably, only a single sealing means or element is used.

Thus, in accordance with embodiments of the invention, the at least one conductive path, at least in an area at the sealing means, includes a chemical or physical bonding between a second surface of the conductive path and the housing or the cover, so as to prevent ambient conditions, such as moist and/or air with a relative high humidity, from entering the housing between said second surface of the conductive path and the housing or cover.

Further advantages of the solution may arise when the external communication equipment is at least partly formed in the cover or in the housing. Hereby the conductive path can additionally and advantageously be used to include cost efficient and effective external communication equipment in the consumption meter.

Further advantageous embodiments of the solution are disclosed in the description of the embodiments. In general the various aspects or embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
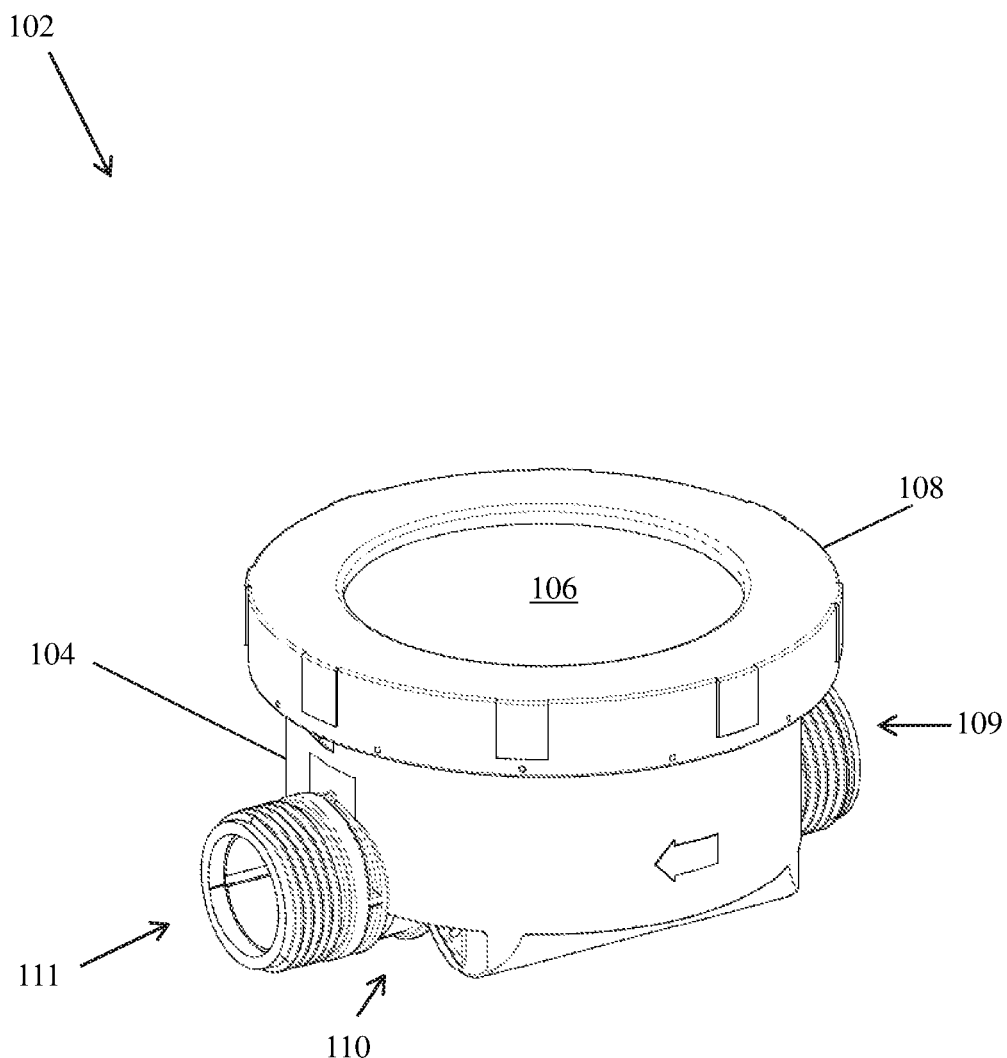
FIG. 1 is a perspective view of a consumption meter.

FIG. 1 is a perspective view of a consumption meter 102. The consumption meter may in embodiments be a consumption meter for charging a consumer a cost of an amount of a supplied utility. Such a consumption meter may also be referred to as a utility meter. The consumption meter may be an energy meter for metering an amount of energy consumed, a heat meter for district heating, a cooling meter for district cooling, a water meter for cold and/or hot water, e.g. distributed drinking water, or a gas meter. The consumption meter may be a legal meter, i.e. a meter which is subdued to regulatory demands. Such regulatory demands may be demands to the precision of the measurements.

Figure 3:
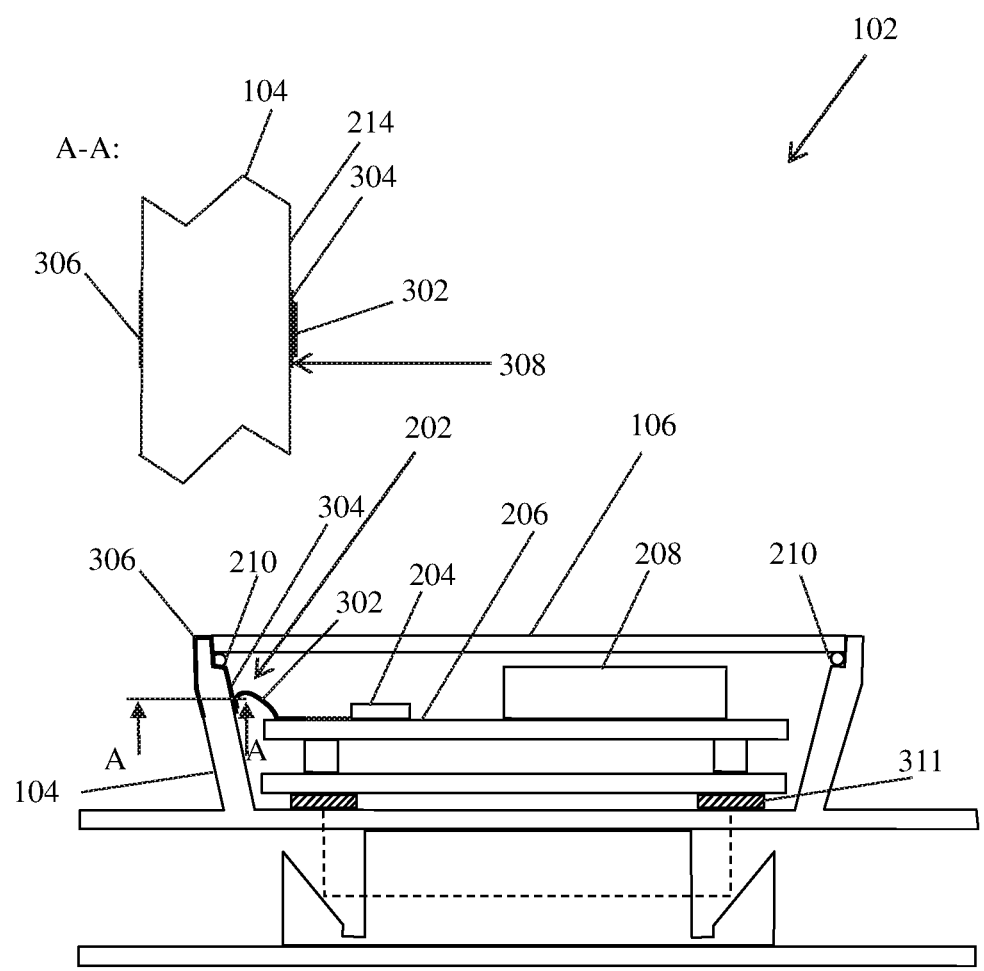
FIG. 3 is a side view of one embodiment of the consumption meter.
Figure 3:
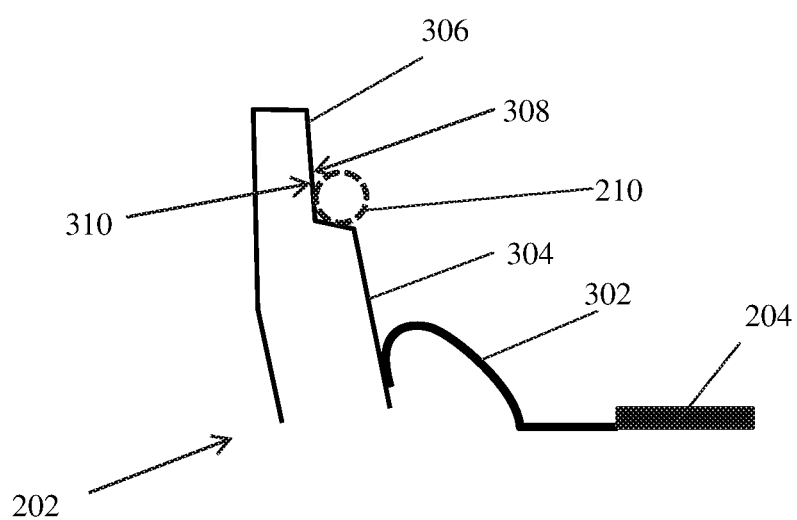

An ultrasonic flow meter, as embodied herein, is a transit time flow meter arranged to measure a flow rate of a fluid flowing in a flow part by use of the known operation principle for transit time flow meters, where ultrasonic signals are emitted at one transducer, see reference 311 in FIG. 3, and received at the other transducer, and where the difference in time-of-arrival between oppositely propagating signals is measured and converted into a flow rate. The piezoelectric transducers are operated by a control circuit, which based on the involved signals generate a signal or value indicative of the flow rate of the fluid. The level of signal treatment of the control circuit may vary from basic signal treatment, where processed signals are output to a further electronic unit for further signal processing, to a complete signal treatment resulting in the determination of the flow rate. Such further electronic unit may be part of the consumption meter 102, or may be part of a separate calculator circuit (not shown) communicatively connected to the consumption meter.

The illustrated consumption meter 102 has a housing 104 closed by a cover 106. In the shown embodiment the housing is in a closed state, where the cover 106 is attached to the housing 104 using a cover holder 108. The cover holder 108 may be an integrated part of the cover or an integrated part of the housing. In the shown embodiment the cover, the housing and the cover holder are separate parts. The housing is provided in a generally, nonconductive polymeric material such as selected from, but is not limited to, the group consisting of polyphenylene sulphide (PPS), polyether sulphone (PES) and Polyether Sulphone (PSU). The cover 106 or at least an area thereof is transparent. The cover may be provided by a polymeric material such as polycarbonate, possibly with a coating, but in the embodiments herein it is provided by glass.

The illustrated consumption meter is a kind which has a flow part 110 with an inlet 109 and an outlet 111 that form a flow passage for a flow of the consumed quantity to be measured. As illustrated, the housing 104 of the consumption meter is integrated with the flow part 110. In some consumption meters, the flow part and the housing are not formed as one integrated part, but may be separate units or parts attached to each other. A separate flow part may also be provided in or comprise a polymeric material, but may alternatively comprise or be provided in metal, such as a metal alloy such as brass, red brass, stainless steel, or other suitable casting alloys.

If the housing 104 was to be integrated in such metal flow part, and be provided in metal, the conductive path could be provided with a non-conductive attachment layer towards such metal housing or the metal housing could comprise a surface towards the conductive path which insulates the conductive path from the metal housing. Though, a polymeric housing is used in the embodiments herein.

The housing serves to protect electronic components, such as a measuring circuit that controls components of the meter for determining the consumed quantity, such as the flow in the flow passage, from conditions outside the housing. The electronic components for an ultrasonic flow meter, as embodied herein, typically comprises ultrasonic transducer(s), as well as any additional electronic equipment, such as a calculation circuit for calculating the consumed quantity, a display for displaying a value representing the consumed quantity, a battery for powering the electronic components and/or or a communication module, e.g. for transmitting a value representing the consumed quantity wirelessly using radio frequencies.

Thus, in addition to the communication module, the housing may additionally include at least one of: ultrasonic transducer(s), a calculation circuit for calculating the consumed quantity, a display for displaying the value representing the consumed quantity and a battery for powering the electronic components.

Figure 2:
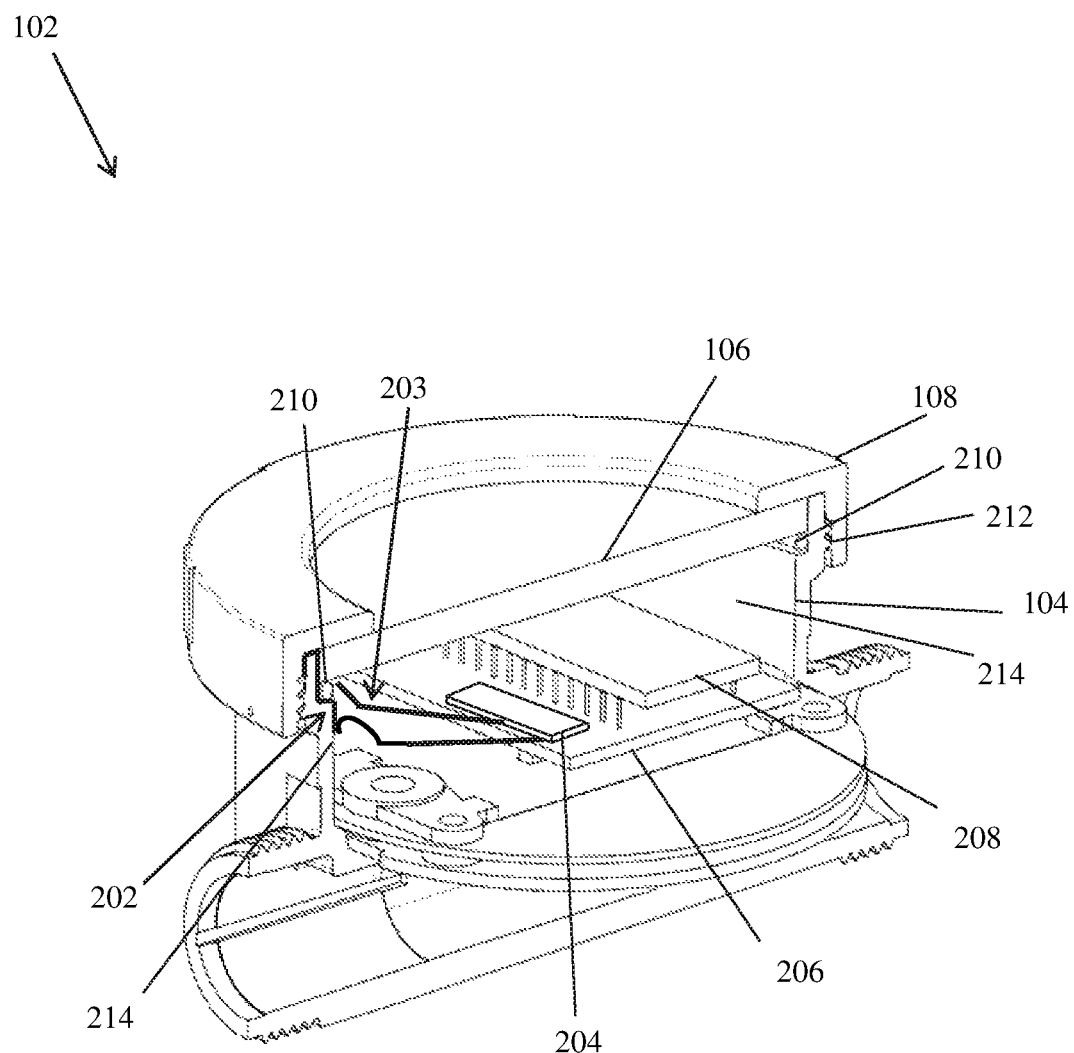
FIG. 2 is the perspective cut through of a first embodiment of the consumption meter, where electronics etc. inside the housing of the consumption meter can be seen.

FIG. 2 is the perspective cut through of an embodiment of a consumption meter, where electronics etc. inside the housing of the consumption meter can be seen. As shown, inside the housing 104, there is provided a circuit board 206 with a display 208 and a communication module 204. The housing also includes a battery and a calculation circuit, but such electronic equipment is not illustrated in the figure. It can be seen from the cut through that the housing 104 is closed by the cover 106 and sealed from outside conditions to form a closed cavity by the sealing means 210. In the shown embodiment the sealing means is an O-ring, i.e. an endless, or unbroken, sealing element 210. The sealing means is provided on a rim of the cavity and arranged for sealed connection with the cover 106, so that the cover 106 and the cavity of the housing 104 define a sealed enclosure, preferably with only a single sealing area and/or a single sealing means. The sealing element is provided in a material to allow it to provide the sealing effect between the housing and the cover, also when minor irregularities and/or surface roughness are comprised in the surfaces and when at least one of the surfaces to seal between is provided with a conductive path as described herein. Typically, the sealing element is a flexible rubber ring-shaped element (O-ring), but may also be provided by other means such as by sealing glue or by sealing paste.

In the shown embodiment the cover holder 108 and the housing 104 are provided with treads 212 so as to close and seal the housing by rotation of the cover holder 108 relatively to the housing and so as to use the treads to press the cover towards the sealing means 210 and hereby form the closed compartment with the closed cavity in the housing 104. It is to be understood that the manner and means for providing this closure may vary from this in several ways, such as not to use treads and/or rotation, but e.g. to press the cover 106 towards the opening of the housing 104 and when a certain pressure and/or position is achieved, the two parts lock to each other in a closed state, e.g. using a snap lock connection.

It is illustrated that at least one conductive path 202 is provided from the communication module 204 via an inner surface 214 of the housing 104. As illustrated, a further conductive path 203 can be provided. This further conductive path is illustrated also to be a conductive feed from the communication module 204, and may e.g., be a conductive feed for a ground part of a conductive feed for an antenna for the communication module. Other conductive paths, possibly using the principles described herein, may be provided, such as paths for connection of external power to the electronics and/or for charging the battery, if present. The conductive path may be a conductive micro strip, a conductive film, a printed conductive layer or thin conductive plating.

FIG. 3 is a side view of the consumption meter illustrated in FIG. 2. The cover holder illustrated in FIG. 2 is for simplicity and/or because it is not needed, not shown in FIG. 3. The figure illustrates the conductive path 202. The conductive path is shown separate and enlarged at the bottom of the figure. The figure moreover shows the section A-A which is a perpendicular cut through the housing wall 104. It follows that the conductive path is a conductive feed from the communication module 204, with a first section 302 transferring the conductive feed from the communication module to a second section 304 comprised on the inner surface 214 of the housing 108. The first and second sections are pressed and held towards each other, so as to form a conductive connection between them in the shown assembled state of the consumption meter and thus closed and sealed state of the housing 104.

From the figure it follows that the conductive path 202 passes and touches the sealing means 210 in an area where the sealing means 210 defines a border and provides a seal between outside ambient conditions and an inside of the closed compartment. A section of the conductive path after the border can be referred to as a third section 306 of the conductive path 202, which third section 306 is provided in the ambient conditions. It is illustrated that the conductive path 202 clings round an edge of the housing 104 at the opening of the housing and in this manner reaches the ambient conditions and enables conductive access to the path outside the closed housing.

It can be seen that the conductive path 202 has a first surface 308 facing, or towards, the sealing means 210 and a second surface 310 facing, or attached to, the housing. At least in an area at the sealing means 210, thus at least in the border or sealing area, the conductive path 202 includes a chemical or physical bonding between the second surface 310 of the conductive path and the housing, so as to prevent ambient conditions, such as moist, from entering the cavity in the housing 104 between said second surface 310 of the conductive path and the housing. The sealing means 210 provides this protection between the first surface 308 and the sealing means 210. In the shown embodiment the at least one conductive path 202 is provided on the inner surface 214 and an outer surface of the housing 104. On the inner surface the second section 304 is provided and on the outer surface the third section 306 is provided.

The first section 302 of the conductive path 202 comprises a flexible, spring like member to be biased towards the second section 304 of the path. The spring like member, such as a spring connector or flexible connector, can be surface mounted on the circuit board 206.

In that the shown embodiment is an ultrasonic flow meter two ultrasonic transducers 311 are illustrated and included in the housing 104.

Figure 4:
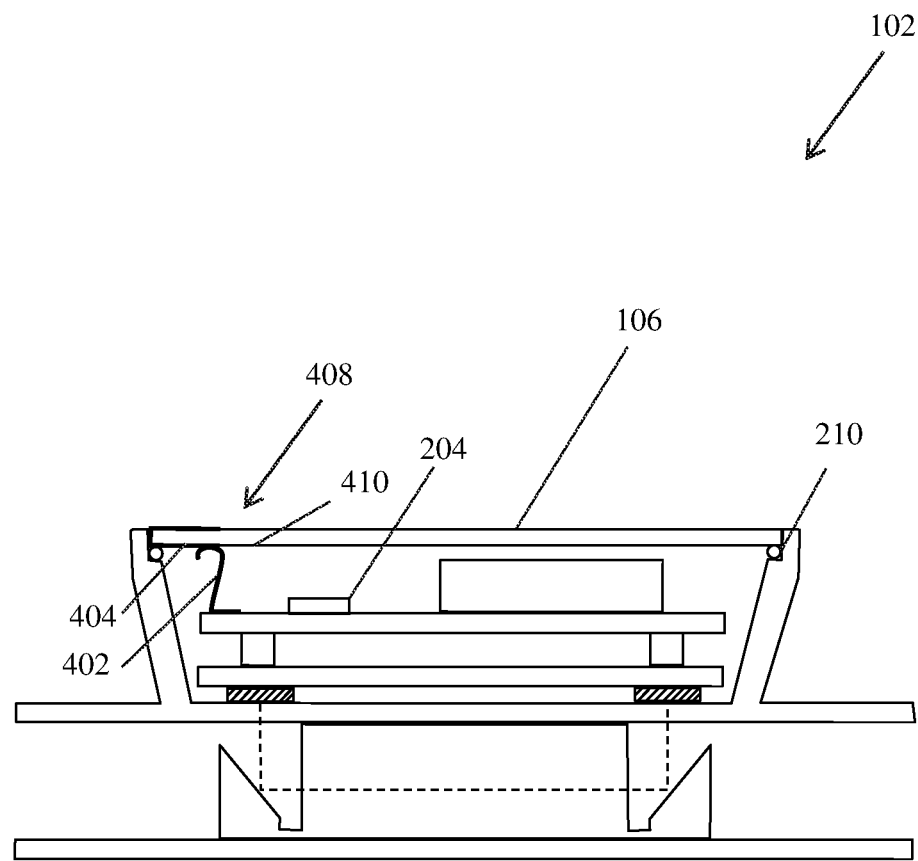
FIG. 4 is a side view of another embodiment of the consumption meter.

FIG. 4 is a side view of another embodiment of the consumption meter. In this embodiment the first section 402 of the conductive path 408 includes a flexible member which is adapted to, when the consumption meter is assembled, be pressed and held towards a second section 404 of the conductive path 408, which second section 404 is provided on an inner surface 410 of the cover 106. It can be seen that the conductive path 408 clings round an edge of the cover 106 close to the sealing means 210.

The embodiments of FIGS. 3 and 4 have a conductive path on both an inner and an outside surface of the housing and the cover, respectively. It is possible that both the housing and the cover are provided with one or more sections of the conductive path, e.g. on both inner and outer surface of the housing and on an outer surface of the cover.

For one or both of the embodiments described in connection with FIGS. 3 and 4, the conductive path may comprise a deposited layer. The conductive path may comprise an attachment layer and a conductive layer. In the embodiments described the at least one conductive path comprises a layer with a thickness of less than 0.1 mm. Preferably a total thickness of the path is less than 0.25 mm or even also less than 0.1 mm.

The attachment layer may be electrically isolating or conductive in dependence on, amongst other aspects, of the adhesive properties of the material of the housing. The attachment layer may be provided in or include materials such as: titanium, chromium or aluminum. The conductive path or a conductive layer of the conductive path may be provided in or include one or more materials such as: gold, silver, copper, nickel, e.g. gold plated nickel.

Figure 5:
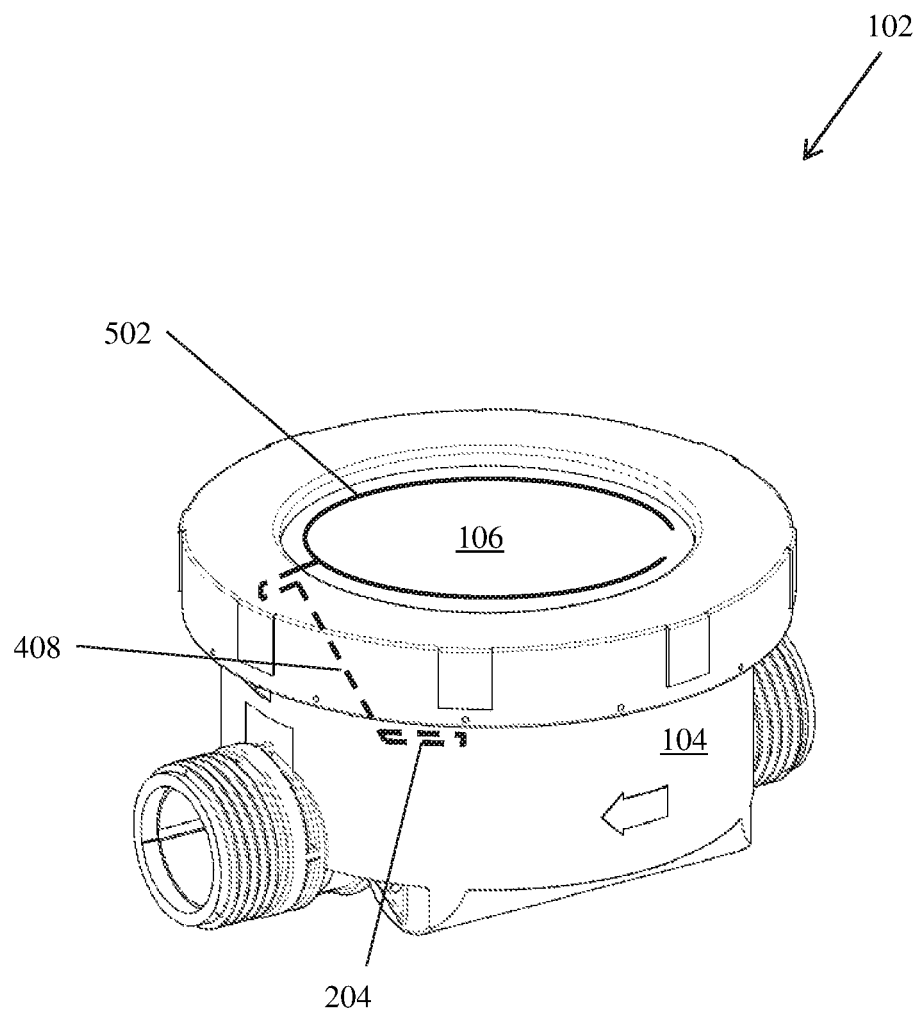
FIG. 5 is a perspective view of an antenna configuration provided on the cover.

FIG. 5 is a perspective view of an antenna configuration 502 provided on the outer surface of the cover 106. The conductive path 408 for the conductive feed through is shown with a dashed line from the communication module 204 inside the closed housing 104, via the inside surface of the cover, passing the opening of the housing 104, round an edge of the cover 106 and onto an outer surface of the cover. The conductive path 408 then forms some shape suited as a part of an external antenna on the cover 106. The external antenna may be protected with a thin protection layer on top of the conductive path on the outside surface of the cover. The external antenna may be one part of a dipole antenna. The external antenna may also be a dipole antenna where two separate conductive paths are provided from the compartment. The two paths may then continue on the external side of the cover and form a dipole external antenna.

Figure 6:
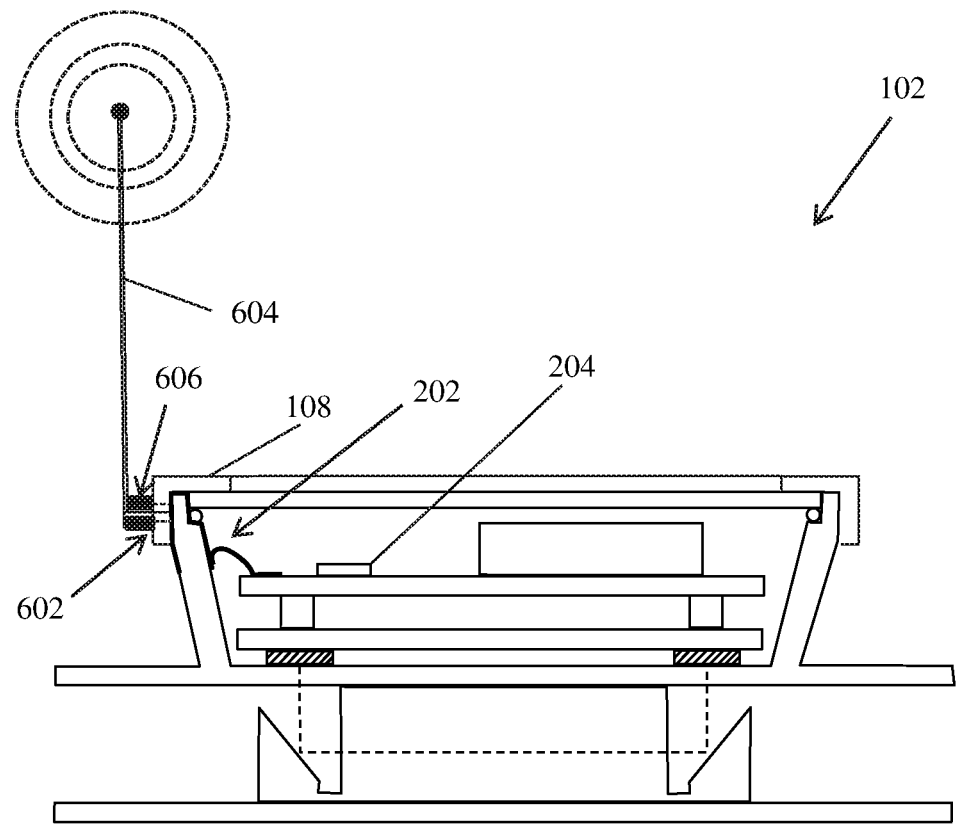
FIG. 6 is a side view of a first terminal configuration with an antenna.

FIG. 6 is a side view of a first terminal configuration with an external antenna 604. The external antenna is operably connected to one or more conductive paths 202 and attached to the consumption meter 102 by attachment means 606. In the shown embodiment the antenna 604 is connected to the third section of the conductive path 202 via an access point or through going hole 602 in the cover holder 108. Alternatively, an alternative element encircling the consumption meter and being operably pressed towards the conductive path at the outside of the consumption meter 102 may be used as an antenna and/or comprise a terminal or a socket for a terminal.

The antenna or aerial may be attached to or incorporated in the consumption meter at delivery or may be attached to and/or operably switched to be connected to the communication module, afterwards, e.g. upon detection of no or pour signals from the consumption meter 102. Instead of an antenna the conductive surface of the conductive path may serve as a terminal for connection of a cable, e.g. by providing a socket at least partly formed in the cover holder or in the housing.

Figure 7:
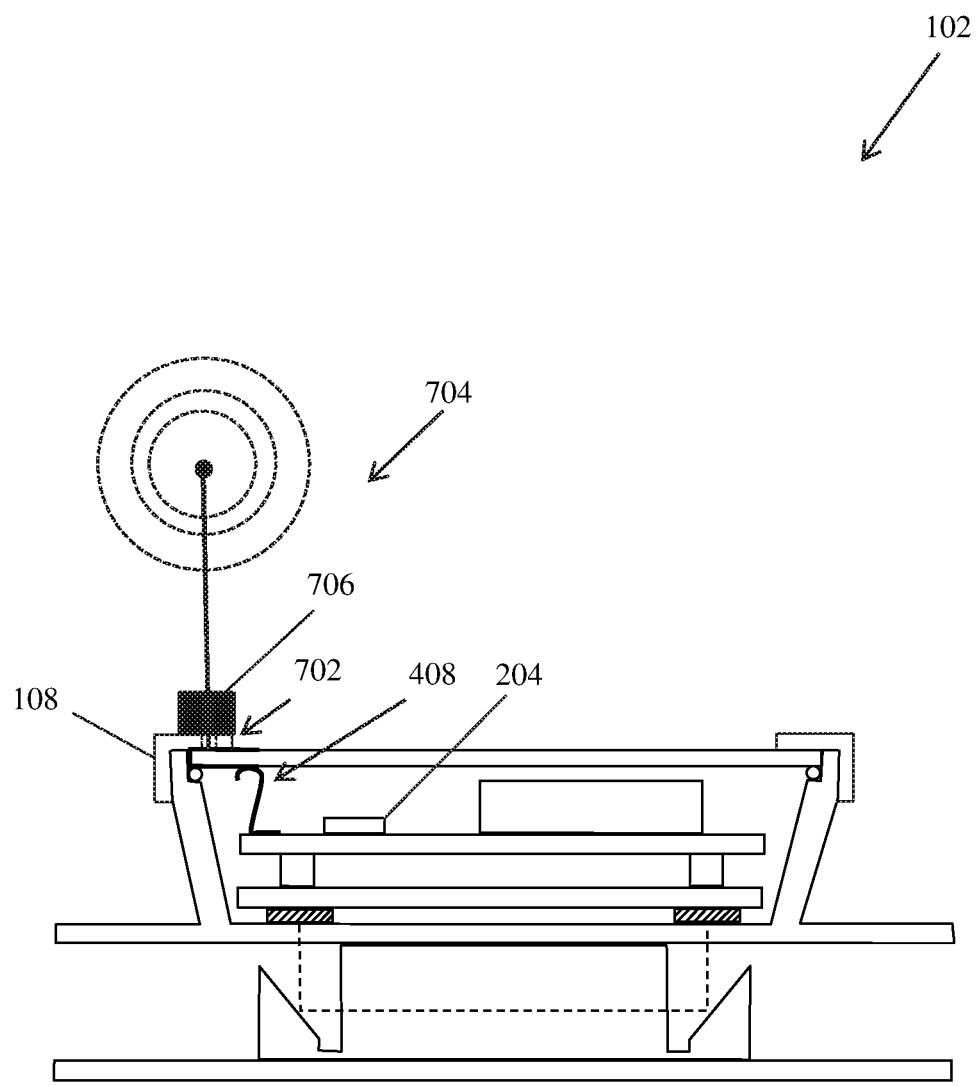
FIG. 7 is a side view of a second terminal configuration with an antenna.

FIG. 7 is a side view of a second terminal configuration with an antenna 704. The external antenna 704 is operably connected to one or more conductive paths 408 and attached to the consumption meter 102 by attachment means 706. In the shown embodiment the antenna 704 is connected a section of the conductive path 408 via an access point or through going hole 702 in the cover holder 108.

Figure 8:
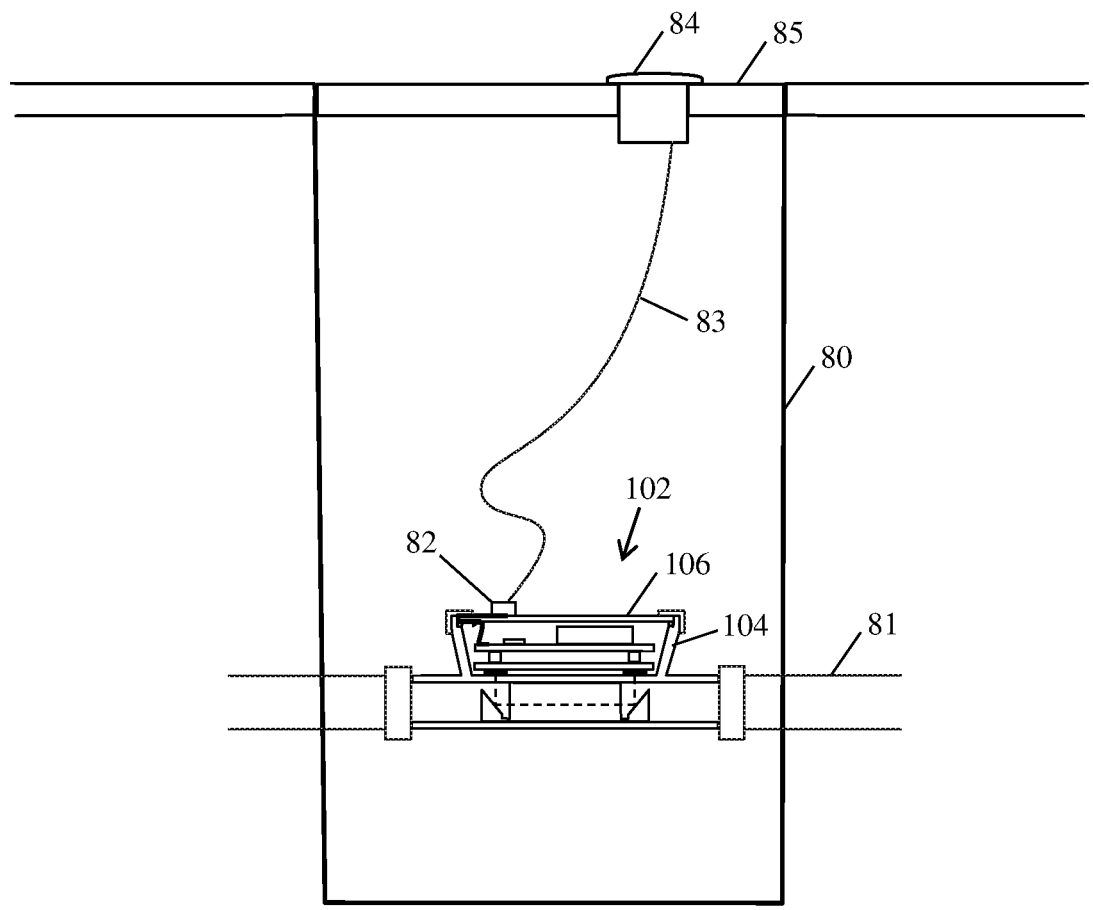
FIG. 8 illustrates an embodiment of a consumption meter where the meter is installed in a meter pit.

FIG. 8 illustrates an embodiment of a consumption meter where the meter is installed in a so-called meter pit 80 where the meter is installed in-line with an underground pipe 81 and connected to a pit lid transmitter 84 installed in a pit lid 85. In the illustrated embodiment, the meter is as illustrated in FIG. 4, where the conductive path is provided on the surface of the cover 106. In general, the conductive path may also be provided as illustrated in FIG. 3, where the conductive path is provided on the surface of the housing 108.

The conductive path is connected to a plug 82 which via a wire 83 connects the communication module of the meter to a pit lid transmitter 84. The pit lid transmitter may be either a passive antenna device, i.e. an external antenna placed in the pit lid 85, or an active antenna device, e.g. to boost or otherwise modify the signal to or from the communication module, or other form of communication equipment.

The plug connector 82 may either be formed together with the cover 106 (or housing 108) or it may be attached as a separate element which facilitates contact between a connecting plug to be inserted in the plug 82 and the conductive path.

Figure 9:
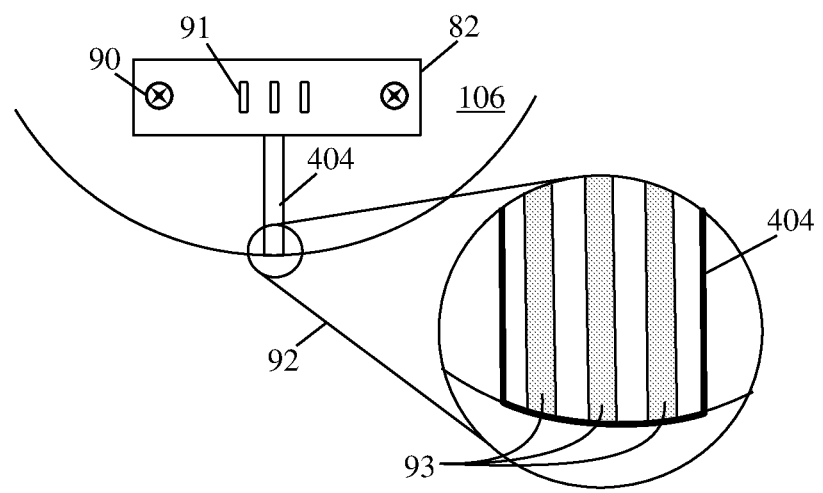
FIG. 9 illustrates an enlarged schematic top view of the plug of FIG. 8.

FIG. 9 illustrates an enlarged schematic top view of the plug 82 of FIG. 8.

The figure illustrates the plug 82 which has been attached to the cover 106 by use of screws 90. The plug comprises a number of sockets 91, or female connectors, capable of receiving a plug with male connectors. The plug 82 is attached over a number of terminals (not shown) of the conductor path 404 (second section). In the enlarged section 92 it is seen that the conductive path is a path with two or more conductive sub-paths 93. Here three sub-paths are shown. The conductive path is thus a collection of paths for providing a number of conductors along the path. In this manner a communication line may be provided to and/or from the communication module to external communication equipment.

In the FIGS. 8 and 9, the external communication equipment is thus the plug 82, the cable 83 and the transmitter 84. In general, the external communication equipment may be any element which facilitates connection of further communication equipment to the consumption meter, such as equipment ranging from a plug or part of a plug to more advanced equipment.

Independent of which kind of terminal, cable, socket or external antenna is or can be attached to or operably connected to the at least one conductive path, 202 or 408, consumption meter 102, the communication module can in embodiments be pre-adjusted for one type of external communication equipment. Alternative or additionally one or more electronic components in the housing may be able to detect the presence of one or more type(s) of external communication equipment and where the communication module is able to switch between adjustments in accordance with the detected external communication equipment. Thus the consumption meter can be equipped with one or more electronic components in the housing which is/are able to detect the presence of one or more type(s) of external antennas. Thus, the communication module, or another piece of electronic equipment in the housing, is then provided for and able to switch between adjustments in accordance with the detected external antenna.

The external antenna may be relatively small, e.g. shorter than 100 mm, or a relatively large external antenna, e.g. 100-250 mm long and connected to an outside part of the consumption meter subject to ambient conditions and where access to the conductive feed through and the conductive part can be provided.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A consumption meter for measuring consumption data of a supplied utility and with a conductive feed through for external communication equipment, the consumption meter comprising:
   a housing with an opening, where the housing forms a closed compartment when the opening of the housing is closed with a cover,
   a seal provided at the opening of the housing configured to provide a sealed closed compartment when the opening of the housing is closed with the cover, and
   a communication module provided in the closed compartment, where the conductive feed through comprises at least one conductive path from the communication module via the opening and to an outside part of the consumption meter, which outside part is subject to ambient conditions outside the closed compartment,
   wherein the at least one conductive path comprises a first and a second section where the first section provides a conductive feed from the communication module, and where the second section is comprised on an inner surface of the housing or an inner surface of the cover, and where the first and second sections form a conductive connection between the first and the second sections when the consumption meter is assembled, and where the seal at the opening of the housing seals against a first surface of the conductive path when the housing is closed with the cover, and
   wherein the first and second sections of the conductive path are pressed and held towards each other to form a conductive connection between the first and second sections when the consumption meter is assembled.

2. The consumption meter according to claim 1, wherein the at least one conductive path compromises a terminal for connection of external communication equipment on the outside part of the consumption meter.

3. The consumption meter according to claim 1, wherein the at least one conductive path passes and touches the seal in a sealing area where the seal provides a barrier between outside ambient conditions and an inside of the closed compartment.

4. The consumption meter according to claim 1, wherein the at least one conductive path clings round an edge of the housing at the opening of the housing or clings round an edge of the cover.

5. The consumption meter according to claim 1, wherein the at least one conductive path comprises a flexible member.

6. The consumption meter according to claim 1, wherein the conductive path comprises a conductive micro strip, a conductive film, a printed layer or a think conductive plating.

7. The consumption meter according to claim 1, wherein the at least one conductive path is provided by a chemical or physical vapor deposition on the housing or on the cover.

8. The consumption meter according to claim 1, wherein the at least one conductive path is formed on or comprises an attachment layer.

9. The consumption meter according to claim 1, wherein the least one conductive path comprises a layer with a thickness of less than 0.1 mm.

10. The consumption meter according to claim 1, wherein one or more of the surfaces of the cover are glass surfaces.

11. The consumption meter according to claim 1, wherein the opening of the housing is a single opening so that the closed compartment can be sealed with a single seal when the opening of the housing is closed with the cover.

12. The consumption meter according to claim 1, wherein the at least one conductive path is a path with two or more conductive sub-paths.

13. The consumption meter according to claim 1, wherein the consumption meter comprises external communication equipment and where the external communication equipment comprises one of an external antenna, a cable for an external antenna, or an external communication device connected to the consumption meter via a cable connected to the conductive path.

14. The consumption meter according to claim 1, wherein the consumption meter comprises an external communication equipment, the external communication equipment being at least partly formed in the cover or in a cover holder or in the housing.

15. The consumption meter according to claim 1, wherein the consumption meter is a water meter, cooling meter, heat meter or energy meter.

16. A consumption meter for measuring consumption data of a supplied utility and with a conductive feed through for external communication equipment, the consumption meter comprising:

a housing with an opening, where the housing forms a closed compartment when the opening of the housing is closed with a cover, a seal provided at the opening of the housing configured to provide a sealed closed compartment when the opening of the housing is closed with the cover, and a communication module provided in the closed compartment, where the conductive feed through comprises at least one conductive path from the communication module via the opening and to an outside part of the consumption meter, which outside part is subject to ambient conditions outside the closed compartment, wherein the at least one conductive path comprises a first and a second section where the first section provides a conductive feed from the communication module, and where the second section is comprised on an inner surface of the housing or an inner surface of the cover, and where the first and second sections form a conductive connection between the first and the second sections when the consumption meter is assembled, and where the seal at the opening of the housing seals against a first surface of the conductive path when the housing is closed with the cover, and wherein the at least one conductive path is provided by a chemical or physical vapor deposition on the housing or on the cover.

17. The consumption meter according to claim 16, wherein the at least one conductive path compromises a terminal for connection of external communication equipment on the outside part of the consumption meter.

18. The consumption meter according to claim 16, wherein the opening of the housing is a single opening so that the closed compartment can be sealed with a single seal when the opening of the housing is closed with the cover.

19. The consumption meter according to claim 16, wherein the consumption meter comprises an external communication equipment, the external communication equipment being at least partly formed in the cover or in a cover holder or in the housing.

20. The consumption meter according to claim 16, wherein the consumption meter is a water meter, cooling meter, heat meter or energy meter.

* * * * *